Oct. 19, 1943.  A. F. KALMAR  2,332,151
METHOD OF PROTECTING WHOLE FRUIT FROM DECAY
Filed July 17, 1941   2 Sheets-Sheet 1
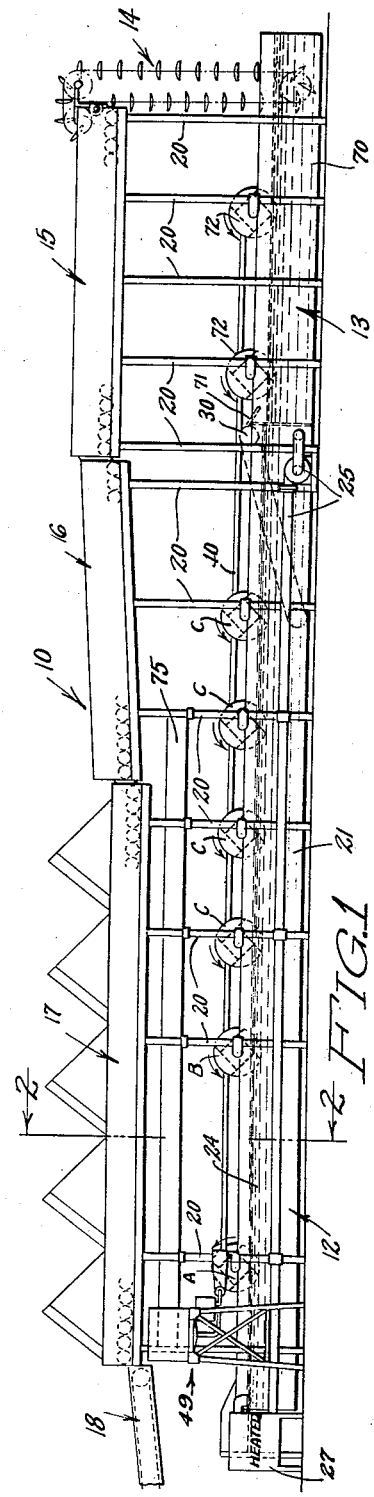
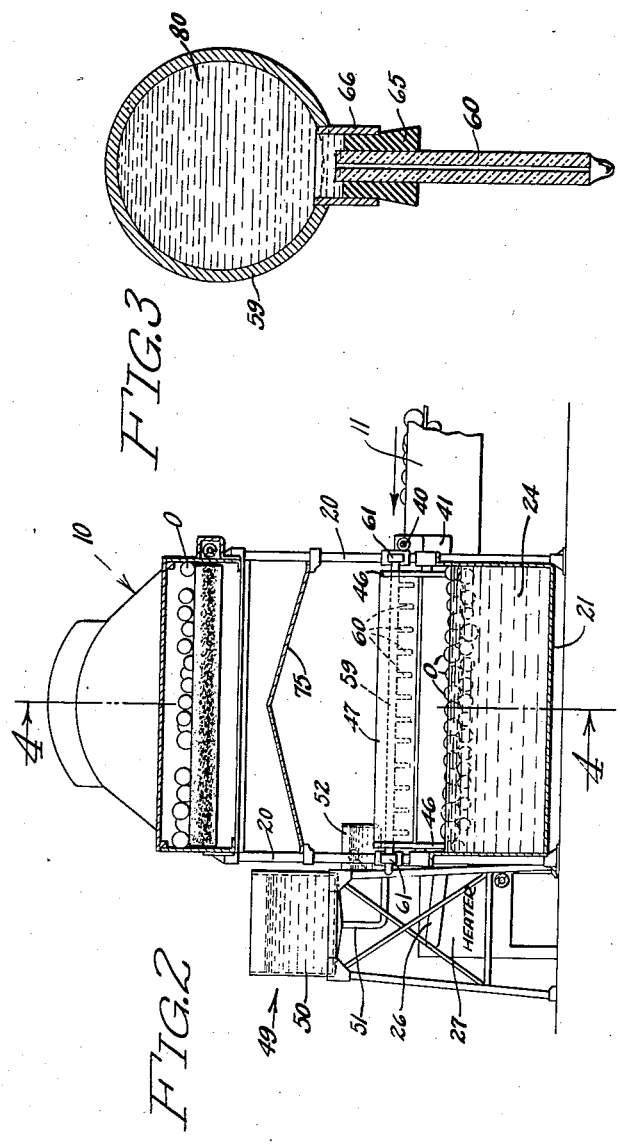
INVENTOR:
ARTHUR F. KALMAR
BY
ATTORNEY Oct. 19, 1943.  A. F. KALMAR  2,332,151
METHOD OF PROTECTING WHOLE FRUIT FROM DECAY
Filed July 17, 1941   2 Sheets-Sheet 2
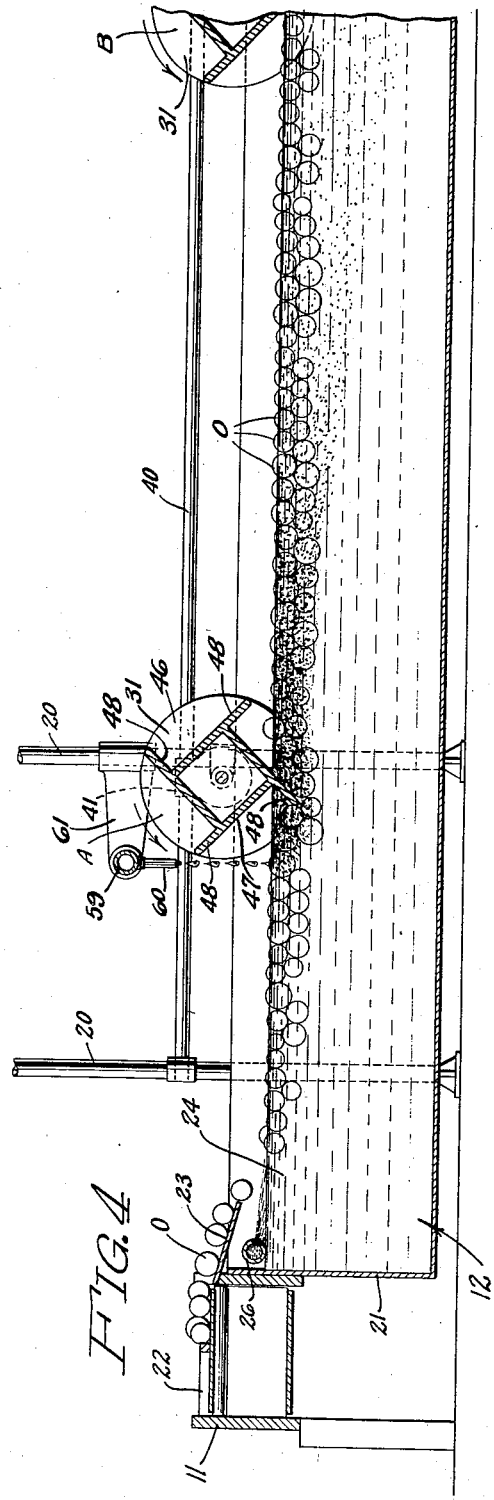
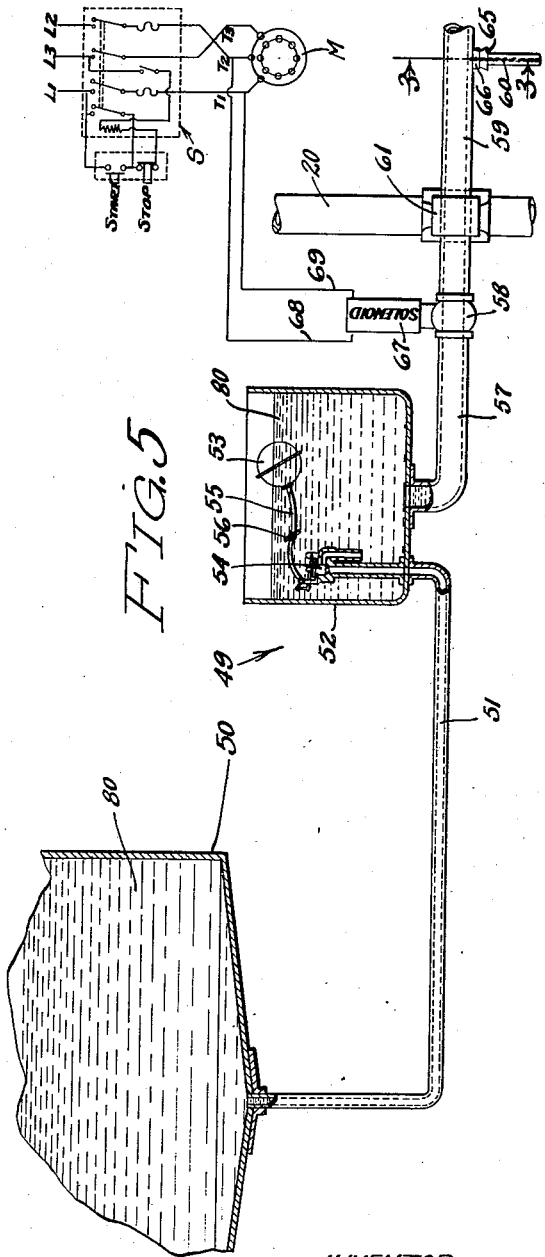
INVENTOR:
ARTHUR F. KALMAR
ATTORNEY Patented Oct. 19, 1943

2,332,151

UNITED STATES PATENT OFFICE 2,332,151

METHOD OF PROTECTING WHOLE FRUIT FROM DECAY

Arthur F. Kalmar, Riverside, Calif., assignor to Food Machinery Corporation, San Jose, Calif., a corporation of Delaware Application July 17, 1941, Serial No. 402,747

16 Claims. (Cl. 99—103)

This invention relates to the commercial preparation of fresh, whole fruit for market and particularly to a novel treatment to be applied to the fruit for the purpose of preserving it from decay and improving its appearance. The invention is especially useful in preparing citrus fruit for market and will be described herein as when so employed.

Incidental to its being handled in the harvesting operation, citrus fruit frequently becomes contaminated with mold spores and other decay causing organisms and it has become common practice to treat the fruit with a fungicidal solution while preparing the fruit for market so as to kill these organisms and thus substantially retard the spoiling of the fruit.

A fungicidal agent widely used for this purpose is sodium hypochlorite. In the treatment of citrus fruit it has many advantages. It not only operates satisfactorily at atmospheric temperature, but in addition to its fungicidal action, it bleaches the dark scar tissue on the fruit so as to improve the appearance of the fruit and enhance its salability.

Many efforts have been made to improve the efficacy of sodium hypochlorite in the treatment of citrus fruit, most of these being in the direction of attempting to find a way to cause a more intimate contact of the solution with the water repellant mold spores and a better penetration of the solution into the cuts and punctures present in the fruit surface. Prior to the present invention these efforts have largely resulted in failure. The suggestion was made that soap be added to the hypochlorite solution to give greater efficacy to the solution but the soap rapidly salted out of the solution thereby failing commercially.

It is an object of my invention to provide a novel process of treating fruit in which the effectiveness of an alkali metal hypochlorite solution in retarding decay and bleaching scar tissue of citrus fruit is increased by enhancing the wetting and penetrating capacity of the solution.

Certain conditions under which citrus fruit is grown and harvested causes it to be weak, that is, readily susceptible to damage and decay. A certain portion of all citrus fruit generally carries purple or red scale which adheres to the outer surface thereof and weak fruit is no exception to the rule. A relatively severe washing operation is necessary to remove this scale, this operation including passage of the fruit through a bath of soap solution heated from 110° F. to 115° F., then vigorously brushing the fruit to remove the scale loosened up by the hot soap. Owing to the susceptibility of weak fruit to heat, it is not practical to subject weak fruit to sufficient heat to loosen up this scale.

It is accordingly a further object of my invention to provide a novel process of preparing fruit for shipment which may be applied to relatively weak fruit, which will combine the effects of giving adequate control of the decay of this fruit and at the same time loosen up the scale present on the surface of the fruit, yet will not require subjecting this weak fruit to a temperature sufficient to damage the fruit.

The process of my invention involves treating the fruit with a solution containing sodium hypochlorite and a synthetic surface active agent of such a character and of such a strength as to produce in the solution a surface tension below about 35 dynes per sq. cm. at 25° C., and an interfacial tension, as measured against a highly refined mineral oil, such as "Nujol," below about 20 dynes per sq. cm. at 25° C.

Surface active agents are generally defined as substances which, when added to a liquid, will lower the boundary tension at the fluid interface of this liquid. The boundary may be between the liquid and air (surface tension); between the liquid and another liquid (interfacial tension); or between the liquid and a solid (interfacial tension). By the term "synthetic surface active agent" I mean to include those surface active agents other than the metallic salts of higher fatty acids known as soaps.

There are a wide variety of synthetic surface active agents but my tests indicate that only certain ones of these are suitable for use in the process of my invention. All of these synthetic surface active agents may be classified under the broad headings anionic, cationic and non-ionic, and I have found that very few of the cationic or non-ionic synthetic surface active agents are serviceable in my process, most of those which I have found suitable coming from the anionic group.

The process of my invention is capable of operating satisfactorily with a solution in which the sodium hypochlorite content varies between a .3% to 3% although the most practical content of sodium hypochlorite in this solution is .6%. I also prefer that this solution be activated with a suitable buffer such as borax, the addition of 2% of this to the solution lowering the pH of the solution to a value between 8.6 and 9.2. The economical use of such a sodium hypochlorite solution requires that the solution be retained in the treating tank without dumping the same throughout a fruit-harvesting season. When such a solution containing sodium hypochlorite is first placed in use at the beginning of the season it contains one mole of sodium chloride for each mole of sodium hypochlorite. In the performance of the process the sodium hypochlorite reacts with the organic matter entering the solution with the fruit, this reaction producing sodium chloride as an end product. This depletes the sodium hypochlorite in the solution and increases the content of sodium chloride therein. The concentration of sodium hypochlorite in the solution is maintained at the desired strength by daily additions of small amounts of a relatively concentrated solution of sodium hypochlorite to the treating solution already in the tank. The continuous formation of sodium chloride in the treating solution gradually increases its salinity until toward the end of the season it may reach a concentration as high as 10%.

Besides having the capacities beforementioned of reducing the surface tension and interfacial tension of the solution, a synthetic surface active agent to be suitable for use in my process must be relatively stable in an alkaline solution of the pH range above mentioned and must be relatively stable and not salt out too rapidly in a solution containing as high as 10% of sodium chloride. It is also important that the synthetic surface active agent of my process be non-toxic to the fruit.

Of the synthetic surface active agents which I have found suitable for use in my process, those coming under the heading "Anionic" fall within one or the other of the following groups:

Sulphated secondary alcohols.
Sulphonated esters of alcohols and dibasic acids.
Sulphonated higher fatty acids.
Sulphonated alkyl aryl compounds.
Sulphonated ethers.

In each instance the product of sulphation or sulphonation is neutralized so as to form the alkali metal salt thereof, the latter being then employed as the synthetic surface active agent of my process.

The surface active agent which I have found most useful in my process of all those tried is Tergitol #4, the chemical name for which is sodium secondary tetradecyl sulphate.

The process and apparatus of the present invention, together with various additional objects and advantages thereof, will best be understood from a description of the preferred form of the process and apparatus embodied in this invention and for this purpose I have hereinafter described such a preferred form in connection with the accompanying drawing.

In the drawing:

Fig. 1 is a diagrammatic side elevational view of a preferred embodiment of the apparatus of the invention.

Fig. 2 is an enlarged transverse sectional view taken on the line 2—2 of Fig. 1.

Fig. 3 is a cross sectional view enlarged to full size and taken on the line 3—3 of Fig. 2, this view illustrating one of the surface active agent capillary dispensing bleeders of the invention.

Fig. 4 is an enlarged longitudinal sectional view taken on the line 4—4 of Fig. 2.

Fig. 5 is a diagrammatic sectional view illustrating the control features of the surface active agent dispensing system of the invention.

Referring specifically to the drawings, the numeral 10 designates generally the apparatus there illustrated and which is adapted to perform the combined functions of treating the fruit with a fungicidal solution, soaking the fruit in a soap solution, washing the fruit mechanically as by passing the same transversely over a series of brush-rolls, rinsing the soap solution from the fruit, eliminating most of the water from the surface of the fruit, and drying from the surface of the fruit the moisture remaining thereon.

The various elements of the apparatus 10 include a loose fruit belt conveyor 11 for receiving fruit, a fungicidal treating apparatus 12, a soap solution treating apparatus 13, a fruit elevator 14, a fruit washer 15, an excess water eliminator 16, an air and brush drier 17, and a loose fruit conveyor 18 on which the processed fruit leaves the apparatus 10.

The washer 15, water eliminator 16, and drier 17 are standard transverse roll units well-known in the art as suitable for performing their respective functions. These units are supported upon pairs of legs 20.

The fungicidal apparatus 12 includes a long shallow tank 21, which is supported between lower portions of adjacent pairs of legs 20, as clearly shown in Figs. 1, 2 and 4. The conveyor 11 extends across the receiving end of the tank 21 and has a sweep 22 which delivers fruit such as oranges "O" across a dropboard 23 into a body of fungicidal treating solution 24 contained within the tank 21. This body of treating solution preferably fills the tank 21 up to the level shown in the drawings, and a liquid circulating system 25 is provided to draw solution from the discharge end of the tank 21 and deliver this from a slot in a pipe 26 as shown in Fig. 4 just beneath the delivery board 23 at the receiving end of the tank 21 so as to create a gentle current in the body of solution 24 flowing from left to right through the entire length of the tank 21.

A heater 27 is provided to raise the temperature of the solution 24 during the cold season so that this preferably remains at about 80° F.

The tank 21 is also provided with an inclined elevator 30 which is power-operated to elevate fruit arriving at the discharge end of the tank 21 and deliver this fruit to the soap solution treating apparatus 13.

Supported in suitable bearings adjustable vertically on certain of the pairs of legs 20 is a plurality of rotary fruit submergers 31. For reference purposes, these submergers may be individually identified by the letters A, B, and C, and are preferably located as follows: Submerger A, about five feet from the left end of tank 21; submerger B, about five feet from submerger A; and submerger C, spaced about thirty inches apart and from submerger B. These submergers are rotated at a uniformly slow rate of speed by a line shaft 40 operating through worm and gear drive units 41.

Each of the submergers 31 includes a pair of circular end walls 46 which are connected by boards to form a square rotor body 47 from the corners of which blades 48 extend as shown in Fig. 4. All surfaces of the tank 21, progressors 31, and conveyor 30, which contact the fungicidal solution, are coated with bitumastic.

Also embraced within the fungicidal treating apparatus 12 is a surface active agent dispensing apparatus 49, this including a surface active agent solution reservoir tank 50 which is connected by a pipe 51 to a float tank 52, the latter tank being disposed at a lower level than the tank 50 and having the flow of solution thereto controlled by a float 53 operating a float valve 54 through a rod 55 having an adjustable joint 56 by which the valve closing position of the float may be adjusted vertically. The solution flows at a uniform rate from the tank 53 through a pipe 57 and solenoid operated valve 58 to a manifold pipe 59 from which this solution is discharged through capillary bleeders 60.

As shown in Fig. 2, the pipe 59 extends across the tank 21 just in advance of the submerger A and is supported by brackets 61 on adjacent legs 20.

The capillary bleeders 60 are preferably spaced about 4 inches apart along the pipe 59, and are connected with the latter by being inserted in rubber stoppers 65 which in turn are inserted into nipples 66 provided in the pipe 58, as shown in Fig. 3.

The valve 58 is controlled by a solenoid 67, the lead wires 68 and 69 of which connect respectively to main leads T—1 and T—3 of a motor M (see Fig. 5) so that the solenoid 67 is energized and the valve 58 held open when the motor M is running, and vice versa. This motor drives all portions of the apparatus 10 which have to do with moving the fruit therethrough, so that relatively concentrated surface active agent solution flows through valve 58 and out of bleeders 60 into the fungicidal solution body 24 when the apparatus 10 is running but stops when the apparatus stops.

The soap solution soaking apparatus 13 includes a tank 70 which is substantially an extension from the tank 21 and is likewise supported on the bottom portions of certain of the apparatus legs 20. This tank has a dropboard 71 positioned for receiving fruit from the inclined elevator 30. The apparatus 13 also has a suitable number of fruit submergers 72 which are identical in construction to the submergers 31 and are rotated co-ordinately therewith by the shaft 40 in the same direction and at the same rate.

The elevator 14 may be of any of the standard types, the construction of which is well-known in the art, and operates continuously, removing fruit from the right hand or discharge end of the tank 70, elevating this fruit and discharging it onto the right hand or receiving end of the washer 15.

Also mounted on the legs 20 between the drier 17 and the tank 21 is a rigid baffle plate 75 which deflects laterally the air currents discharged downward from the drier, thereby preventing these currents interfering with the treatment taking place in the tank 21.

In performing the process of my invention, the apparatus 10 preferably is operated as follows:

The tank 70 is provided with a soap solution to substantially the level indicated in Fig. 1, while the tank 21 is provided with a fungicidal solution 24 to approximately the same level. This fungicidal solution contains sufficient sodium hypochlorite to produce from .5% to .7% available chlorine and with a pH buffered down to between 8.6–9.2 by the addition thereto of about 2% of borax.

From time to time throughout the day's operation, concentrated solution of hypochlorite may be added to the solution body 24 so as to keep the strength of this latter solution within the desired range. If close control of the concentration is desired, suitable means may be provided for dripping relatively concentrated hypochlorite solution into the bath at exactly the same rate that hypochlorite is being lost by its breaking down in the treating process and by the removal of hypochlorite from the bath with the fruit discharged therefrom on the elevator 30. A uniform optimum concentration of available chlorine in the solution thus will be maintained at all times.

When the process is started the solution 24 contains about .5% of sodium chloride. This concentration steadily increases due to the hypochlorite breaking down in the process into NaCl. In my invention the process may be continued without changing the solution until the salt in the solution reaches a concentration of about 10%.

A quantity of surface active wetting agent solution 80 with a concentration of 1.5% to 4% is now prepared and placed in the reservoir tank 50. This solution runs down through the pipe 51 to the tank 52 until the level of the solution in this tank rises to the point shown in Fig. 5, where the float 53 is lifted sufficiently to close the valve 54. From the tank 52, this solution flows through the pipe 57 to the solenoid valve 58, which, until the motor M has been started, is automatically closed. A quantity of the selected surface active agent is at this time also placed in the body of fungicidal solution 24, so as to form a concentration of the surface active agent in the fungicidal solution of preferably from .15% to .3%.

The apparatus 10 is now in readiness for starting the day's run of fruit therethrough and the motor M is therefore energized with electricity supplied through the lead wires T—1, T—2 and T—3. This automatically energizes the solenoid 67, and opens the valve 58, causing the flow of surface active solution 80 into the bleeder manifold 59, and the dripping of this solution from the bleeders 60 into the body of fungicidal solution 24, as shown in Fig. 4. At the time this happens, the shaft 40 starts rotating the fruit submergers 31 and 72 in the direction indicated by the arrows, Figs. 1 and 4, and the conveyor 11 commences delivering fruit such as oranges "O" into the left hand end of the fungicidal tank 21. When the apparatus 10 is set in operation, the circulating system 25 starts circulating the solution body 24 as previously described, so that the fruit delivered into this flows over the dropboard 23 and drifts with the current thus set up in the solution toward the constantly rotating submerger A. As the blades 48 of this submerger come downward each of these engages a quantity of the fruit which has drifted under this blade, submerges this fruit beneath the surface of the solution, rotates the individual pieces of fruit thus submerged, and carries this fruit forward so that the fruit rises to the surface of the solution on the right hand side of the submerger. On the start of operation of the apparatus 10 and throughout the period it is running, the surface active solution 80 is dropping downward from the bleeders 60 just to the left of the submerger A. These drops of concentrated surface active agent are uniformly distributed across the tank 21, and drop at a uniform rate so as to greatly increase the degree of concentration of surface active agent in those portions of solution 24 which surround the fruit drifting with the current of this solution from the submerger A toward the submerger B.

The area in which this increased concentration of surface active agent occurs is indicated by stippling in Fig. 4, this also illustrating how the surface active agent in this area gradually becomes diffused as the fruit travels toward the submerger B. I have found that the effectiveness of a given quantity of surface active agent in securing an immediate intimate contact of the chlorine in the solution with the mold spores and the surface of the fruit is greatly enhanced by this feature of my method. The rapidity with which the surface active agent performs its function varies with the degree of concentration of the surface active agent in the fungicidal solution. Thus, in the area just in advance of the submerger A, the fruit is surrounded with a fungicidal solution including a surface active agent of unusually high strength, thereby producing in a very short space of time a thorough wetting of the mold spores and the exterior surfaces of the fruit by the fungicidal solution. Once this wetting has taken place, the fungicidal agent, which in this case is active chlorine, is enabled to commence its killing action on the mold spores and other decay-causing organisms with which it is thus brought into contact. From the point where this thorough wetting occurs on through the balance of the period during which the fruit is traveling in the fungicidal solution 24, the fungicidal agent is thus able to be uniformly and continually active on all portions of the fruit, and the mold spores.

When the fruit passes under each of the submergers B and C, it is of course again completely submerged under the surface of the fungicidal solution.

While the period of treatment in the tank 21 may be varied from one minute upwards, it has been found that from 2 to 5 minutes submersion in the solution 24 following a complete wetting of the fruit is commercially practical and produces very superior results.

Variations in the rate at which the surface active agent is fed through the bleeders 60 into the fungicidal solution may be accomplished by adjusting the level of the float 53 which closes the valve 54, this latter being effected by manipulation of the adjustable joint 56 in the float rod 55.

The rate at which the surface active agent is fed through the bleeder 60 into the fungicidal solution is so adjusted that the strength of the concentration of surface active agent in the entire solution 24 is maintained substantially constant. In other words, this rate is so adjusted that the surface active agent is fed into this solution to just compensate for the surface active agent removed from the solution with the fruit passing therefrom on the inclined elevator 30.

A series of laboratory tests substantially duplicating the process performed in the commercial operation of the apparatus 10 as above described produced results which show conclusively the marked superiority of the present invention over the best fungicidal processes previously in use. To make this test of the process extremely severe, all the fruit tested was first thoroughly inoculated with dry blue and green mold spores, a condition which is much worse than what ordinarily occurs in commercial practice. The following data records the results of four comparative groups of these tests. (The letters OSSAA are here used to designate an organic synthetic surface active agent.)

| | Percent decay |
|---|---|
| Test No. 1, 6 days: | |
| Untreated fruit | 46.4 |
| Regular hypo—5 min | 17.8 |
| Regular hypo plus .20% OSSAA—5 min | 3.6 |
| Regular hypo—2 min | 32.1 |
| Regular hypo plus .20% OSSAA—2 min | 10.7 |
| Test No. 2, 7 days: | |
| Untreated fruit | 75.0 |
| Regular hypo—5 min | 60.8 |
| Regular hypo plus .25% OSSAA—5 min | 3.6 |
| Regular hypo—3 min | 50.0 |
| Regular hypo plus .25% OSSAA—3 min | 21.2 |
| Test No. 3, 7 days: | |
| Untreated fruit | 80.8 |
| Regular hypo—5 min | 34.6 |
| Regular hypo plus .25% OSSAA—5 min | 15.8 |
| Regular hypo—3 min | 57.5 |
| Regular hypo plus .25% OSSAA—3 min | 34.6 |
| Test No. 4, 6 days: | |
| Untreated fruit | 56.2 |
| Regular hypo—5 min | 37.5 |
| Regular hypo plus .25% OSSAA—5 min | 12.5 |
| Regular hypo plus .25% OSSAA—3 min | 25.0 |

In the above data, the term "regular hypo" refers to the process of contacting fresh whole fruit with an aqueous solution of sodium hypochlorite containing approximately .6% available chlorine, and with the pH buffered down to a value of approximately 9.2.

In addition to the remarkable superiority thus demonstrated by the process of my invention as a mold retardant for fresh whole fruits, this process also shows a radical increase in capacity over "regular hypo" in the bleaching of scar tissue and other blemishes appearing on the surface of the citrus fruit treated thereby. According to various estimates, the operation of this process so improves the appearance of scarred fruit as to permit from 15% to 30% of this fruit to be packed and sold under a higher priced grade than it was possible to sell this fruit under when treated by the best previously known method.

Besides possessing these virtues, the process of my invention provides a means not hitherto available by which the scale may be cleaned from citrus fruit without subjecting the same to a relatively hot soap bath. It is thus possible by my process to prepare weak citrus fruit for market without raising the temperature of this fruit substantially above atmospheric, and thereby greatly increase the capacity of this fruit to resist decay and remain in good condition when delivered at the market.

As stated in describing the operation of my process, the fungicidal solution 24 thereof is preferably maintained by the heater 27 at a temperature not to exceed 80° F. This temperature is not so high as to have any damaging effect on weak citrus fruit and I have found that the synthetic surface active agent of my solution 24 operates not only to secure the beneficial results hereinbefore set forth, but also to penetrate between the surface of the fruit and the scale adhering thereto so as to loosen the hold of this scale on the surface of the fruit whereby the scale is readily removed by the brushing given the fruit in the washer 15. This action of the solution 24 on the scale on the fruit renders it unnecessary to have the soap solution in the tank 13 heated to any higher temperature than the solution 24 and this practice is followed where performing the process of my invention on weak fruit.

What I claim is:

1. A method of protecting whole fruit from decay, comprising the step of contacting the fruit with an aqueous solution containing .3% to 3.0% available chlorine and an alkali metal salt of a sulphated anionic surface active agent.

2. A method of protecting whole fruit from decay, which comprises contacting fruit with an aqueous solution containing a hypochlorite of an alkali-forming metal and an alkali metal salt of a sulphated secondary alcohol.

3. A method of protecting whole fruit from decay, which comprises contacting fruit with an aqueous solution containing a hypochlorite of an alkali-forming metal and an alkali metal salt of a sulphonated ester of alcohol and dibasic acid.

4. A method of protecting whole fruit from decay, which comprises contacting fruit with an aqueous solution containing a hypochlorite of an alkali-forming metal and an alkali metal salt of a sulphonated higher fatty acid.

5. A method of protecting whole fruit from decay, which comprises contacting fruit with an aqueous solution containing a hypochlorite of an alkali-forming metal and an alkali metal salt of a sulphonated alkyl aryl compound.

6. A method of protecting whole fruit from decay, which comprises contacting fruit with an aqueous solution containing a hypochlorite of an alkali-forming metal and an alkali metal salt of a sulphonated ether.

7. A method of protecting whole fruit from decay, which comprises contacting the fruit with an aqueous solution of an alkali hypochlorite of sufficient strength to provide .3% to 3% available chlorine and a surface active agent selected from a group consisting of: sulphated secondary alcohols, sulphonated esters of alcohols and dibasic acids, sulphonated higher fatty acids, sulphonated alkyl aryl compounds, sulphonated ethers, polyether alcohols and quaternary ammonium compounds, said surface active agent being present in sufficient strength to produce a surface tension below about 35 dynes per sq. cm. at 25° C. and an interfacial tension below about 20 dynes per sq. cm. at 25° C.

8. In a fruit treating process, the step of inhibiting decay of fruit, which comprises bringing fresh whole fruit into contact with an aqueous solution of a fungicidal agent containing an alkali metal hypochlorite and contacting said fruit in an initial portion of said treatment with a solution of a surface active agent selected from a group consisting of: sulphated secondary alcohols, sulphonated esters of alcohols and dibasic acids, sulphonated higher fatty acids, sulphonated alkyl aryl compounds, sulphonated ethers, polyether alcohols and quarternary ammonium compounds, and with a strength of approximately .5% to 5%.

9. A method of protecting whole fruit from decay, which comprises providing an aqueous solution of fungicidal agent containing an alkali metal hypochlorite, submerging fresh whole fruit in said solution, causing said fruit to travel over a given path in said solution, said solution also containing a surface active agent selected from a group consisting of: sulphated secondary alcohols, sulphonated esters of alcohols and dibasic acids, sulphonated higher fatty acids, sulphonated alkyl aryl compounds, sulphonated ethers, polyether alcohols and quaternary ammonium compounds, and with a strength of .05% to 1%, and subjecting said fruit, during an initial portion of said travel and while submerged in said solution, to a substantially stronger concentration of said surface active agent.

10. A method of protecting fresh whole fruit from decay, which comprises bringing said fruit into contact with a relatively strong solution of an alkali metal salt of a sulphated secondary alcohol and following this with a considerably longer contact of said fruit with an aqueous solution containing a hypochlorite of an alkali forming metal.

11. A method of protecting fresh whole fruit from decay, which comprises bringing said fruit into contact with a solution of a surface active agent, selected from a group consisting of: sulphated secondary alcohols, sulphonated esters of alcohols and dibasic acids, sulphonated higher fatty acids, sulphonated alkyl aryl compounds, sulphonated ethers, polyether alcohols and quaternary ammonium compounds, and with a strength of approximately .5% to 5% and following this with a considerably longer contact of said fruit with an aqueous solution containing a hypochlorite of an alkali forming metal.

12. A method of protecting fresh whole fruit from decay which comprises conveying said fruit a substantial distance through an aqueous bath and continually introducing into said bath a solution of a surface active agent, selected from a group consisting of: sulphated secondary alcohols, sulphonated esters of alcohols and dibasic acids, sulphonated higher fatty acids, sulphonated alkyl aryl compounds, sulphonated ethers, polyether alcohols and quaternary ammonium compounds, said surface active agent being introduced as aforesaid into a portion of said bath through which said fruit is conveyed just after being introduced into said bath whereby said fruit will be contacted by said surface active agent before substantial dilution of said agent in said bath occurs, and maintaining in said bath an aqueous solution of a fungicidal agent containing an alkali metal hypochlorite.

13. A method of protecting fresh whole fruit from decay which comprises bringing said fruit into contact with an aqueous fungicidal bath having in solution an alkali hypochlorite in sufficient strength to make available .3% to 3% chlorine and sodium secondary tetradecyl sulphate.

14. A method of protecting fresh whole fruit from decay, which comprises contacting fruit with an aqueous solution containing a hypochlorite of an alkali-forming metal and a quaternary ammonium compound.

15. A method of protecting fresh whole fruit from decay, which comprises contacting fruit with an aqueous solution containing a hypochlorite of an alkali-forming metal and a polyether alcohol.

16. A method of protecting fresh whole fruit from decay, which comprises bringing said fruit into contact with an aqueous fungicidal bath having in solution an alkali hypochlorite and sodium secondary tetradecyl sulphate.

ARTHUR F. KALMAR.